United States Patent
Billings

(10) Patent No.: US 8,523,476 B2
(45) Date of Patent: Sep. 3, 2013

(54) POSITIONING AND DAMPER DEVICE USING SHEAR FORCE FROM CYCLIC DIFFERENTIAL COMPRESSIVE STRAIN OF A CROSS-LINKED THERMOPLASTIC

(75) Inventor: Philip Billings, Shoreview, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 146 days.

(21) Appl. No.: 12/791,834

(22) Filed: Jun. 1, 2010

(65) Prior Publication Data

US 2011/0293356 A1 Dec. 1, 2011

(51) Int. Cl.
*B25G 3/00* (2006.01)

(52) U.S. Cl.
USPC ............. 403/41; 403/203; 403/226; 403/228; 403/372; 403/115; 16/342

(58) Field of Classification Search
USPC ................. 403/111, 120, 145, 203, 225, 228, 403/365, 372, 164, 165, 221, 226, 359.1, 403/359.2, 359.6; 16/342; 464/30, 89
See application file for complete search history.

(56) References Cited

U.S. PATENT DOCUMENTS

| | | | |
|---|---|---|---|
| 2,458,707 A * | 1/1949 | Jacobs | 296/97.11 |
| 2,572,160 A * | 10/1951 | Kelly, Jr. et al. | 403/228 |
| 2,572,215 A | 10/1951 | Swart | |
| 3,097,150 A | 7/1963 | Rainer et al. | |
| 3,446,340 A | 5/1969 | Mullen | |
| 3,591,674 A | 7/1971 | Engel | |
| RE29,823 E * | 11/1978 | Sievers et al. | 403/225 |
| 4,231,135 A | 11/1980 | Fradin | |
| 4,445,623 A | 5/1984 | Kolling et al. | |
| 4,452,591 A | 6/1984 | Fishbaugh et al. | |
| 4,626,112 A | 12/1986 | Kramer | |
| 4,654,478 A | 3/1987 | Ishihara et al. | |
| 4,667,530 A | 5/1987 | Mettler et al. | |

(Continued)

FOREIGN PATENT DOCUMENTS

| | | |
|---|---|---|
| EP | 1160467 | 12/2007 |
| GB | 747986 | 4/1956 |

(Continued)

OTHER PUBLICATIONS

International Search Report for International Application No. PCT/US2011/038178 mailed Sep. 1, 2011 (5 pages).

(Continued)

*Primary Examiner* — Daniel P. Stodola
*Assistant Examiner* — Jonathan Masinick
(74) *Attorney, Agent, or Firm* — Dicke, Billig & Czaja, PLLC

(57) ABSTRACT

A positioning device includes first, second and third elements. The first element includes a cross-linked thermoplastic and the second element is non-circular and configured adjacent a first side of the first element, and configured for relative rotation with the first element about an axis. The third element is configured adjacent a second side of the first element. The first, second and third elements are configured such that a first compressive strain amount is induced on the first element while there is no relative rotation between the first and second elements and a second compressive strain amount is induced on the first element while there is relative rotation between the first element and the second element. The second compressive strain amount is at least 3 times higher than the first compressive strain amount.

17 Claims, 8 Drawing Sheets

(56) References Cited

U.S. PATENT DOCUMENTS

| | | | |
|---|---|---|---|
| 4,688,961 A | 8/1987 | Shioda et al. | |
| 4,861,107 A | 8/1989 | Vidwans et al. | |
| 4,927,403 A | 5/1990 | Pate, Sr. | |
| 4,932,924 A | 6/1990 | Lobel | |
| 5,085,289 A | 2/1992 | Chance | |
| 5,253,947 A | 10/1993 | Petrzelka et al. | |
| 5,397,531 A | 3/1995 | Peiris et al. | |
| 5,509,176 A | 4/1996 | Karl | |
| 5,632,071 A | 5/1997 | Maunder | |
| 5,832,566 A | 11/1998 | Quek et al. | |
| 5,836,821 A | 11/1998 | Yamada et al. | |
| 5,924,665 A | 7/1999 | Sweere et al. | |
| 6,026,776 A | 2/2000 | Winberg | |
| 6,085,387 A | 7/2000 | Han | |
| 6,101,676 A * | 8/2000 | Wahl et al. | 16/342 |
| 6,230,365 B1 * | 5/2001 | Lu | 16/342 |
| 6,281,264 B1 | 8/2001 | Salovey et al. | |
| 6,286,187 B1 | 9/2001 | Chang | |
| 6,510,588 B2 * | 1/2003 | Eromaki | 16/308 |
| 6,581,267 B1 | 6/2003 | Olbrich | |
| 6,711,781 B2 * | 3/2004 | Hsiu | 16/342 |
| 6,728,993 B1 * | 5/2004 | Murayama | 16/342 |
| 6,871,383 B2 * | 3/2005 | Huang | 16/295 |
| 6,928,700 B2 * | 8/2005 | Huong | 16/342 |
| 7,153,571 B2 | 12/2006 | Allermann | |
| 7,377,012 B2 * | 5/2008 | Lu | 16/342 |
| 7,500,288 B2 * | 3/2009 | Chung et al. | 16/342 |
| 7,578,031 B2 * | 8/2009 | Hung | 16/342 |
| 7,891,055 B1 * | 2/2011 | Combs | 16/342 |
| 2002/0174519 A1 | 11/2002 | Huang | |
| 2007/0212162 A1 * | 9/2007 | Schank et al. | 403/2 |
| 2009/0036609 A1 | 2/2009 | Feng et al. | |

FOREIGN PATENT DOCUMENTS

| | | |
|---|---|---|
| JP | 769075 | 3/1995 |
| WO | 9015265 | 12/1990 |
| WO | 0050717 | 8/2000 |
| WO | 2005027801 | 3/2005 |

OTHER PUBLICATIONS

Written Opinion of the International Searching Authority for International Application No. PCT/US2011/038178 mailed Sep. 1, 2011 (6 pages).

E.I., du Pont de Nemours and Company, "Delrin(R)," DuPont Heritage: Delrin(R), pp. 1 (1995). <http://heritage.dupont.com/floater/fl_delring/floater.shtml>.

KLC, "Wirsbo AquapexTM, Engel Method Cross-Linked Polyethylene Technical Data Sheet," TECHPEX.doc, pp. 1 (May 4, 2005).

Wikimedia Foundation, Inc., "Delrin," Wikipedia, the free encyclopedia, pp. 1-3, (Jan. 18, 2007). <http:llen.wikipedia.org/wiki/Delrin>.

Wikimedia Foundation, Inc., "PEX," Wikipedia, the free encyclopedia, pp. 1-3, (Feb. 2, 2007). <http://en.wikipedia.org/wiki/PEX>.

* cited by examiner

POSITIONING AND DAMPER DEVICE USING SHEAR FORCE FROM CYCLIC DIFFERENTIAL COMPRESSIVE STRAIN OF A CROSS-LINKED THERMOPLASTIC

CROSS-REFERENCE TO RELATED APPLICATIONS

This patent application is related to U.S. patent application Ser. No. 11/683,791 entitled "CROSS-LINKED THERMOPLASTIC TORQUE ENGINE," having a filing date of Mar. 8, 2006, the contents of which are incorporated herein by reference.

BACKGROUND

Many applications require controlled movement between two elements. For example, hinges are often used for providing a movable connection between different portions of an apparatus. This movement often requires repeated cycles of smooth and substantially repeatable force exerted by the user of the device to position one element relative to another element. The result of this movement is positioning of the device in a way that resists further movement against disturbing environmental forces such as imposed by gravity or vibration.

One such example of such a hinge mechanism is in conjunction with a laptop computer, which hinges a screen relative to a base. Other applications may include relative linear motion between two elements. For example, it may be desired to control the up and down motion of a headrest relative to a seat.

Unlike simpler bearing applications, whose object is to minimize wear by minimizing friction, controlled movement and positioning devices must generate significant and substantially repeatable forces or torques through controlled friction, often over many thousands of operating cycles. Furthermore, the need to minimize the size of these elements relative to these forces and torques results in the generation of internal stresses hundreds of times greater than those experienced by typical bearing applications.

This need to withstand unusually large stresses has limited the usable material choices for these applications. Typical lower strength bearing materials are not only unpredictable at these stress conditions given the lack of published performance data, but are also not suitable given the multiple failure modes which may appear at these conditions.

For these reasons, the preferred technology set for such devices has been precision-formed hardened steel surfaces lubricated with grease. However, this technology results in higher than desired cost, complexity of manufacture, and complications attendant to grease application.

Engineering plastics, while finding wide use in bearing applications, have found only limited use in such controlled movement and positioning applications. While eliminating the need for grease with their self-lubricating properties, these engineering plastics typically cannot withstand high internal stresses without stress relaxation, creep, wear resulting in torque loss, or torque increases resulting in catastrophic failure of the mechanism, making them unsuitable for applications requiring both small size and large repeatable forces and torques. A few engineering plastics such as UHMW-PE have partially overcome this size drawback, but require more expensive manufacturing operations than molded or extruded plastics to achieve a finished, functional shape.

For these and other reasons, there exists a need for the present invention.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1A:
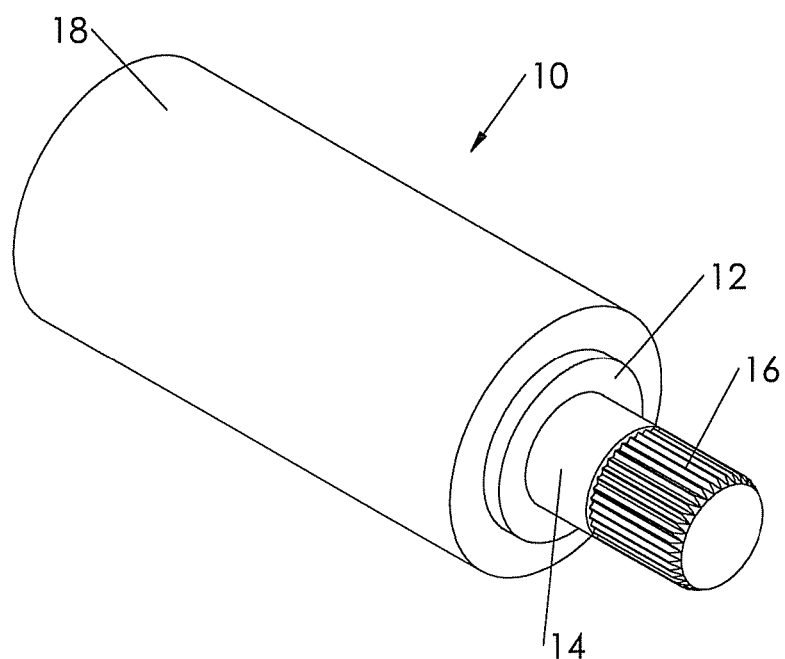
FIGS. 1A and 1B illustrate prospective and cross-sectional views of a compressed shearing-force mechanism.
Figure 1B:
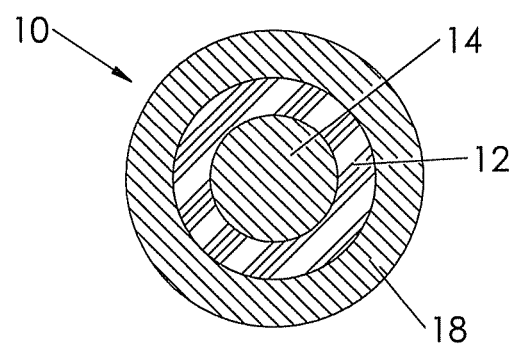

FIGS. 1A and 1B illustrate respective prospective and cross-sectional views of compressed shearing-force mechanism 10 accordance to one example. Compressed shearing-force mechanism 10 includes compressed insert 12, shaft 14, and housing 18. In one example, shaft 14 also includes knurls 16. In one example, sleeve 12 is securely fixed to housing 18, such press fit thereto. In one example, compressed insert 12 and shaft 14 of compressed shearing-force mechanism 10 are configured to rotate relative to each other to generate a near-constant torque.

In one example, compressed insert 12 is made of a cross-linked thermoplastic material, such as PEX, and is inserted between shaft 14 and housing 18. Relative to the cross-linked thermoplastic of compressed insert 12, shaft 14 and housing 18 are of sufficient rigidity to maintain a strain ($\epsilon$) imposed on compressed insert 12. In one example, shaft 14 and housing 18 are mild steel and in another they are hardened steel. In one example, the outer diameter of shaft 14 is greater than the inner diameter of compressed insert 12, and/or the outer diameter of compressed insert 12 is greater than the inner diameter of housing 18, such that insertion of compressed insert 12 between shaft 14 and housing 18 deflects or compresses compressed insert 12, thereby loading compressed insert 12 with relatively uniform strain ($\epsilon$).

In one example, compressed shearing-force mechanism 10 can be used to generate relatively constant torque. Shaft 14 can be rotated within compressed insert 12, while compressed insert 12 is held stable. For example, a hinged element can be coupled to the knurls 16 of shaft 14 and rotated with shaft 14 relative to compressed insert 12. The relatively uniform strain ($\epsilon$) imposed on compressed insert 12 by shaft 14 and housing 18, in combination with the relative rotation of compressed insert 12 and shaft 14, creates a relatively uniform torque.

This relatively uniform torque of compressed shearing-force mechanism 10 can be subject to temperature dependence, however. When compressed shearing-force mechanism 10 is subjected to large temperature changes, such as those encountered in many practical storage or transport conditions such a mechanism will encounter, significant torque variation can be induced when operation of the device is resumed. While compressed shearing-force mechanism 10 experiences torque variability with temperature variation during use, it experiences even greater torque variability when subjected to temperature variation during storage. Consequently, a device configured with compressed shearing-force mechanism 10 may have a certain torque profile during a certain application, and then after being stored at a significant temperature variation, have a completely different torque profile in that same application.

Figure 1C:
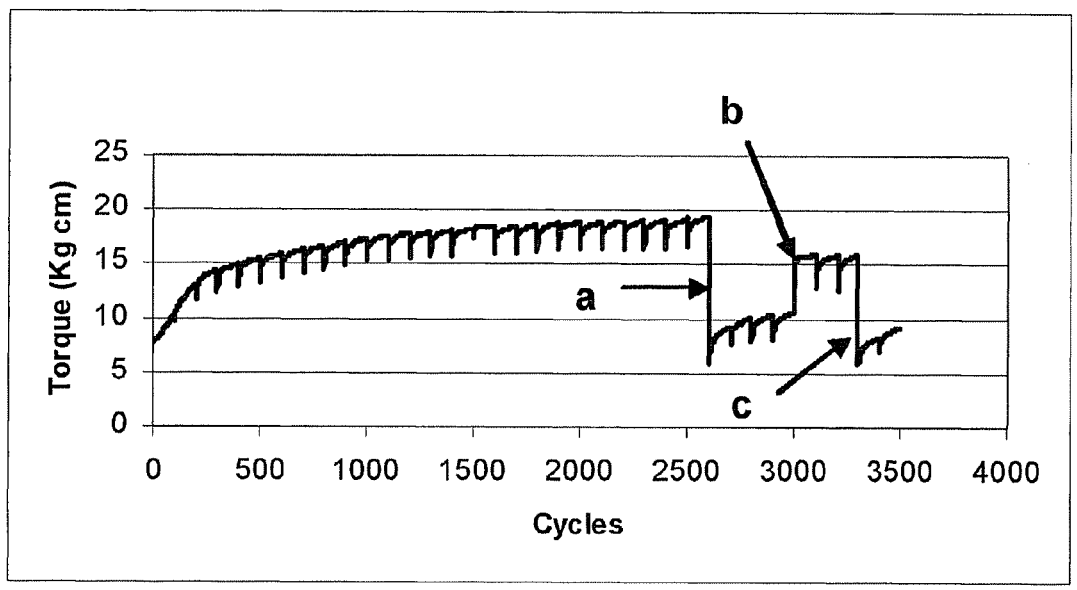
FIG. 1C is a graph illustrating torque over a number of cycles for a compressed shearing-force mechanism.

FIG. 1C is a graph illustrating the temperature dependency of compressed shearing-force mechanism 10. FIG. 1C illustrates torque, in Kg-cm, over thousands of cycles of shaft 14 rotating relative to compressed insert 12. It is seen that a relatively constant torque between 15 and 20 Kg-cm is observed for thousands of cycles at ambient room temperature.

When compressed shearing-force mechanism 10 is subjected to storage temperatures significantly higher or lower than ambient room temperature, however, significant changes in torque are observed. At point "a" on the graph of FIG. 1C, cycling was halted and compressed shearing-force mechanism 10 was subjected to 150 degrees F. for 30 minutes. When cycles were resumed, the torque observed dropped by more than 50%. At point "b" on the graph of FIG. 1C, cycling was again halted and compressed shearing-force mechanism 10 was subjected to 0 degrees F. for 30 minutes. When cycles were resumed, the torque observed increased dramatically. Finally, at point "c" on the graph of FIG. 1C, cycling was halted and compressed shearing-force mechanism 10 was again subjected to 150 degrees F. for 30 minutes. When cycles were resumed, the torque observed again dropped dramatically.

The effect of temperatures on compressed shearing-force mechanism 10 is repeatable, and is in part a result of changing internal stresses within the cross-linked thermoplastic material of compressed insert 12 caused by temperature change with the cross-linked thermoplastic material while in a stressed condition. As such, if a shearing-force mechanism 10 is configured in a product that is exposed to very high temperatures, such as in a trunk of a car, when the product is next used at normal temperature, the shearing force, and thus, performance of the product, will change significantly. Also, if a product configured with shearing-force mechanism 10 is shipped in a cargo hold of a plane and exposed to very low temperatures, when subsequently used, the product will exhibit a different torque profile than it would before the low-temperature exposure.

Figure 2A:
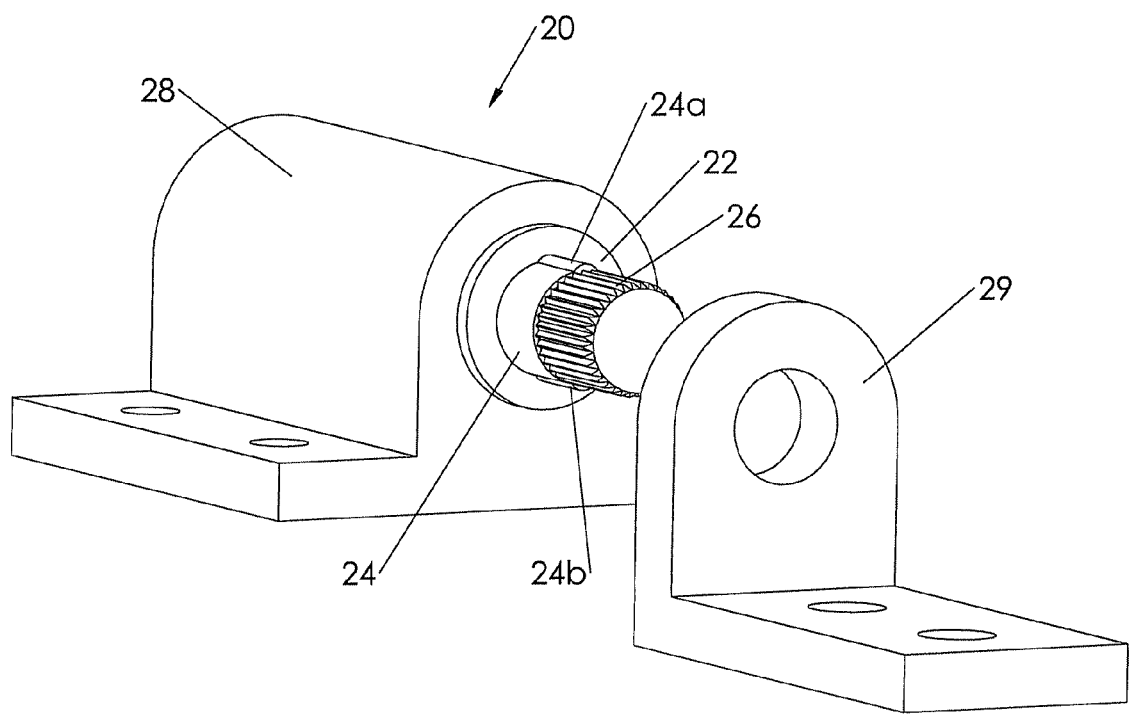
FIGS. 2A and 2B illustrate prospective and cross-sectional views of a shearing-force mechanism with differential compressive strain in a torque hinge application in accordance with one embodiment.
Figure 2B:
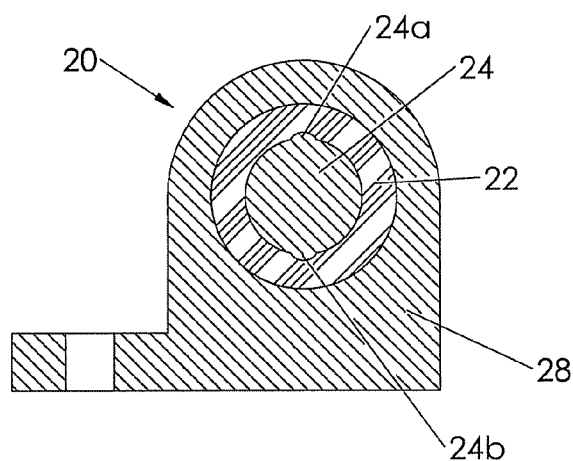

FIGS. 2A and 2B illustrate respective prospective and cross-sectional views of shearing-force mechanism 20 with differential compressive strain in accordance with one embodiment. Shearing-force mechanism 20 includes sleeve 22, shaft 24 and housing 28. In one embodiment, shearing-force mechanism 20 is configured as torque hinge. As such, hinged mount 29 is provided and shaft 24 also includes knurls 26 for engagement with a receiving hole in hinged mount 29. Also, housing 28 is configured for mounting, such as with a flat portion with holes for attaching to a surface. As hinged mount 29 rotates relative to the mount to which housing 28 is attached, relatively uniform toque is generated in shearing-force mechanism 20. Such a torque hinge could be used in a computer laptop, for example, to hinge a screen relative to a base.

In one embodiment, shearing-force mechanism 20 is configured with cyclic differential compressive strain. As such, it is not subject to the same temperature dependence observed in compressed shearing-force mechanism 10. In one embodiment, cyclic differential compressive strain is achieved by avoiding significant interference between sleeve 22 and shaft 24 while at rest, and inducing compressive strain while components are moving relative to each other over many thousands of cycles.

In one embodiment, sleeve 22 is made of a cross-linked thermoplastic material, such as PEX-A, PEX-B, or PEX-C. Sleeve 22 is securely fixed within housing 28, and in one embodiment it is press fit into housing 28 such that there is no relative rotation between them. Shaft 24 is inserted into sleeve 22, and in one embodiment, shaft 24 is configured with first and second protrusions 24a and 24b. In one embodiment, sleeve 22 has pockets or slots to accommodate and receive first and second protrusions 24a and 24b so as to avoid or minimize interference between sleeve 22 and shaft 24 when there is no relative rotation between them. In another embodiment, once shaft 24 and first and second protrusions 24a and 24b are inserted into sleeve 22, sleeve 22 is allowed to relax, and compressive strain initially imposed on sleeve 22 in the area under first and second protrusions 24a and 24b will largely dissipate.

In one embodiment, there is little or no interference between sleeve 22 and housing 28, and is little or no interference between sleeve 22 and shaft 24, while there is no relative movement between sleeve 22, shaft 24 and housing 28. As such, while shearing-force mechanism 20 is at rest, that is, no relative rotation between shaft 24 and sleeve 22, there is little or no compressive strain ($\epsilon$) imposed on sleeve 22. However, when shearing-force mechanism 20 is active, that is, there is relative rotation between shaft 24 and sleeve 22, significant compressive strain ($\epsilon$) is imposed on sleeve 22 during that relative rotation.

As shaft 24 is rotated, and thus, first and second protrusions 24a and 24b are rotated, first and second protrusions 24a and 24b move from the slots accommodating them in sleeve 22 and begin to drive into adjacent sections of sleeve 22. This displaces sleeve 22 in those sections adjacent first and second protrusions 24a and 24b causing compressive strain ($\epsilon$) on sleeve 22 at the sections. As such, compressive strain ($\epsilon$) on sleeve 22 at these sections changes from little or no compressive strain ($\epsilon$) to significant compressive strain ($\epsilon$) as shaft 24 and sleeve 22 changes from no relative rotation to relative rotation. In one embodiment, this differential compressive strain ($\epsilon$) is greater than 3 percent, that is, first and second protrusions 24a and 24b cause at least 3 percent more compressive strain ($\epsilon$) on sleeve 22 when there is relative rotation between shaft 24 and sleeve 22 than they cause when there is no rotation between shaft 24 and sleeve 22. In another embodiment, the differential compressive strain ($\epsilon$) is greater than 6 percent.

In another embodiment, an initial compressive strain may exist between sleeve 22 and the circular portion of shaft 24 (that is, the area without protrusions 24a and 24b) at rest of up to ⅓ the compressive strain imposed by movement of first and second protrusions 24a and 24b on the sleeve 22 without creating the temperature storage/torque dependence already described. In the event that assembly of the device, or some other condition, creates at-rest compressive strains between sleeve 22 and the circular portion of shaft 24 sufficient to introduce temperature/torque dependency, the device may be heated to bring the at-rest compressive strain in sleeve 22 to a near zero condition. In one embodiment using PEX cross-linked thermoplastic, this temperature may vary from 150 degrees F. to 275 degrees F. As such, after heat treatment, there is little or no compressive strain ($\epsilon$) imposed on sleeve 22 while at rest.

Temperature changes have little effect on shearing-force mechanism 20 in one embodiment. Since shearing-force mechanism 20 is configured with minimal compressive strain while at rest, there are little changing internal stresses within the cross-linked thermoplastic material that are caused by temperature change in the cross-linked thermoplastic material. As such, a hinge or similar product configured with shearing-force mechanism 20 can be subjected to relatively large temperature variations while at rest, and the hinge or product will still produce a consistent torque when in use.

Furthermore, shearing-force mechanism 20 is cyclic, that is, it produces a repeatable shearing force over thousands of cycles of rotation between shaft 24 and sleeve 22. This repeatable shearing force is relatively stable, even over substantial temperature changes, so that even where shearing-force mechanism 20 is configured as a hinge that is subjected to significant temperature changes, the hinge still performs well, yielding consistent and repeatable shearing force.

In one embodiment, shaft 24 and housing 28 are of sufficient rigidity to impose compressive strain ($\epsilon$) on sleeve 22 during relative rotation. In one example, shaft 24 and housing 28 are mild steel and in another they are hardened steel.

In some embodiments, when cross-linked thermoplastic material is used for sleeve 22, it can remain elastic up to approximately 6% compressive strain ($\epsilon$), which is far beyond the elastic limit of most plastics. "Elastic" as used here, means that the material will return to its original dimension when unloaded or unstrained, for example, when first and second protrusions 24a and 24b move away from sections of sleeve 22. Furthermore, in some embodiments the cross-linked thermoplastic material remains a viable material for generating repeatable shear at compressive strain ($\epsilon$) up to and beyond 15%. In one embodiment, the ability to cycle repeatedly through, and recover from, such high compressive strain rates without catastrophic failure is achieved through (1) the cross linking of molecules which forms covalent bonds between molecules, and (2) the relatively low modulus (stiffness) of 75,000 to 100,000 psi. Configuring sleeve 22 with PEX-A, PEX-B, and PEX-C can achieve these conditions and attributes, and other embodiments may use cross-linked thermoplastics with moduli up to 200,000 psi.

Although one type of thermoplastic has shown some promise in withstanding significant compressive strain ($\epsilon$) is ultra high molecular weight (UHMW) thermoplastics, UHMW has limitations. UHMW thermoplastic is generally defined as thermoplastic having a molecular weight of 3,100,000 or more. These UHMW materials, are not practical for many applications. In addition to being quite expensive, these UHMW materials cannot be easily injection molded or even readily extruded.

UHMW materials have a melt flow index of zero and, as such cannot be readily injection molded. Furthermore, regular tool steel will dull easily on UHMW materials. Dull tools will then overheat the surface, causing internal stresses and possibly warping or distortion. UHMW-PE is most often formed into bulk shapes, and then machined. While the bulk material is somewhat more expensive than other engineering plastics, the need to machine it further widens the cost disadvantage. All of these limitations complicate manufacturing and forming UHMW materials in many practical applications or even prevent their use in many other applications.

Where sleeve 22 is a cross-linked thermoplastic material, however, it can be easily formed into a desired shape, for example, by injection molding or extruding a thermoplastic into the desired form. The thermoplastic can be cross-linked during or after forming to create the cross-linked thermoplastic material and its associated properties. Once sleeve 22 formed with cross-linked thermoplastic material, it has the properties needed to withstand a relatively uniform and stable stress ($\sigma$) at very high compressive strain ($\epsilon$) without causing the cross-linked thermoplastic to deform past its elasticity. In one example, sleeve 22 is formed with cross-linked thermoplastic material and is loaded with compressive strain ($\epsilon$) well beyond 3 percent during rotation, such that a relatively uniform torque is generated with relative rotation of sleeve 22 and shaft 24.

The amount of compressive strain induced into sleeve 22 by protrusions 24a and 24b is affected by the overall height of the protrusions relative to the overall wall thickness of sleeve 22. For example, in one embodiment sleeve 22 is configured with a nominal outer diameter of 0.50 inches and nominal inner diameter of 0.350 inch for an overall nominal wall thickness of 0.075 inch. Where first and second protrusions 24a and 24b are configured with a nominal height of 0.01 inch, sleeve 22 will be strained during rotation approximately 13% (or 0.01 inch divided by 0.075 inch). Relative heights for first and second protrusions 24a and 24b and thicknesses for sleeve 22 can be selected to adjust compressive strain in accordance with various embodiments.

In addition, in some embodiments, protrusions 24a and 24b on shaft 24 can be adjusted about the outer diameter of shaft 24 and additional protrusions can be added, allowing for great flexibility in generating a variable torque profile for shearing-force mechanism 20. Protrusions 24a and 24b typically affect an arc segment of shaft 24 of about 15 degrees. Variation in the profile of sleeve 22 allows a variable interference with the shaft protrusions, generating a custom torque profile for any particular application. This non-circular interior profile of sleeve 22 may be fabricated through extrusion, molding, or re-forming the cross-linked thermoplastic at its transition temperature, which is about 275 degrees F. for PEX, and then cooling.

In one embodiment, shearing-force mechanism 20 can be used in applications such as "quiet close" toilet seats. While round shafts offer only constant torque possibilities, shearing-force mechanism 20 with a plurality of protrusions and variable interference with these protrusions offer flexibility to truly shape the torque profile.

Furthermore, in applications such as these, shearing-force mechanism 20 is configured to take advantage of the viscous sliding friction of the cross-linked thermoplastic of sleeve 22. Under certain conditions, sleeve 22 of shearing-force mechanism 20 is configured to exhibit viscous or speed dependent properties when sliding with frictional shearing force against shaft 24 and protrusions 24a and 24b. This application of sliding viscous friction between two dry materials can be used to mimic performance of viscous fluid devices, without the complexity of a viscous liquid or seals need to contain the liquid under pressure.

Figure 2C:
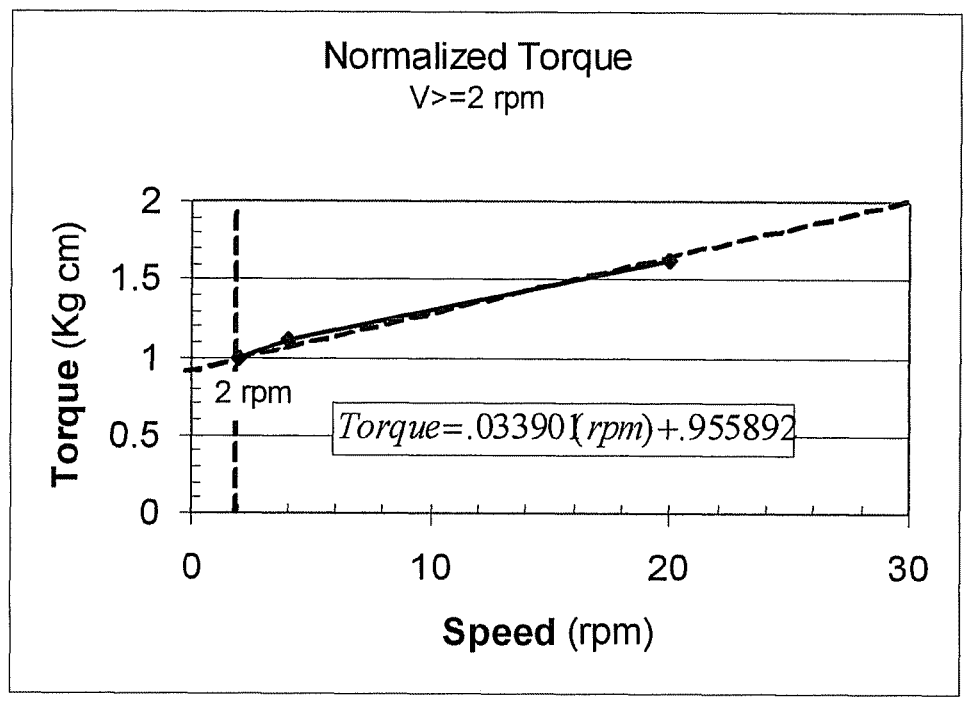
FIG. 2C is a graph illustrating torque in a shearing-force mechanism as a function of speed.

In one embodiment, shearing-force mechanism 20 is configured such that housing 28 and sleeve 22, which are coupled together, act as a damper on shaft 22 contained therein. In one embodiment, the torque in shearing-force mechanism 20 is speed dependent. In one case, the torque increases with speed. FIG. 2C is a graph illustrating how torque in shearing-force mechanism 20 varies as a function of speed.

In one example, for RPM over 2, torque varies by a factor of 1.6 in linear fashion up to 20 RPM. In one case, between 0 and 2 RPM, the torque varies by a factor of 2 (0.5 kg cm@0 rpm, 1 kg cm@2 rpm), and varies in a logarithmic manner. Such a torque profile provides a favorable characteristic for use as a damper. Furthermore, because shearing-force mechanism 20 provides little or no compressive strain on sleeve 22 at rest, the torque profile and speed to torque relationship is minimally affected by temperature storage changes, such as described above.

Figure 3A:
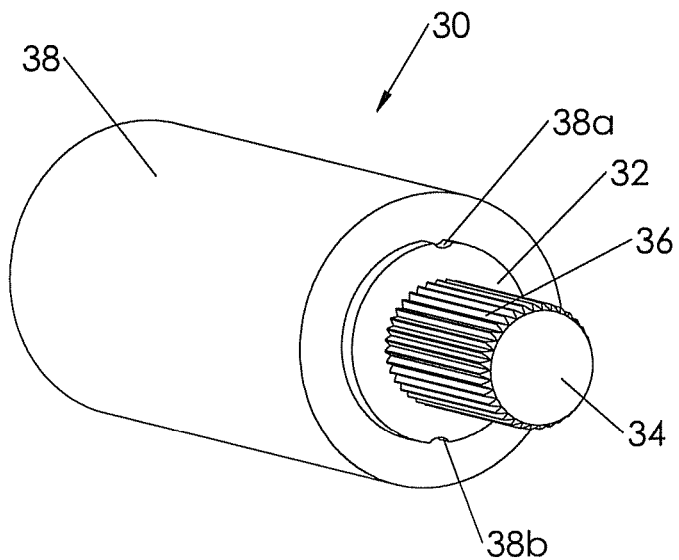
FIGS. 3A and 3B illustrate prospective and cross-sectional views of a shearing-force mechanism with differential compressive strain in accordance with one embodiment.
Figure 3B:
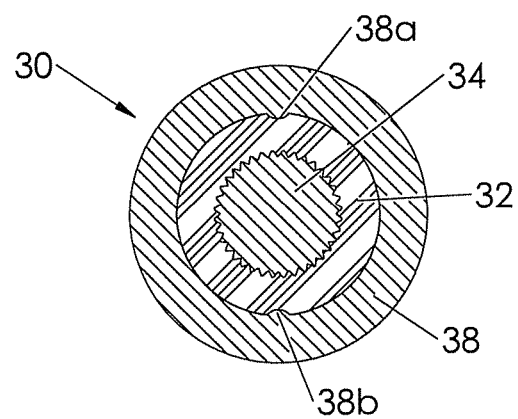
Figure 4A:
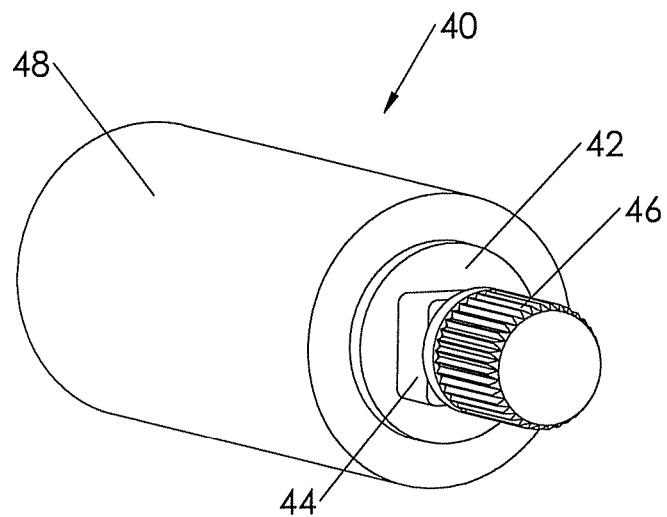
FIGS. 4A and 4B illustrate prospective and cross-sectional views of a shearing-force mechanism with differential compressive strain in accordance with one embodiment.
Figure 4B:
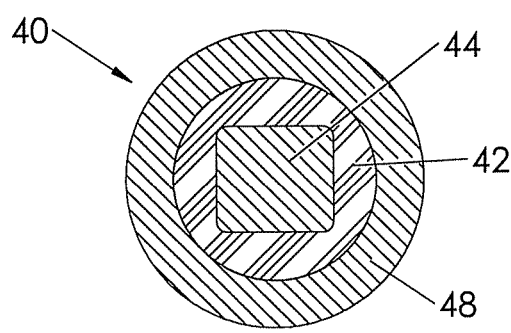
Figure 5A:
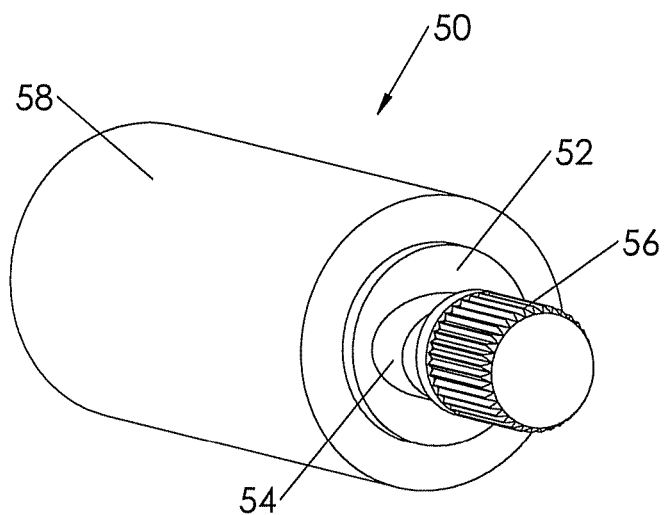
FIGS. 5A and 5B illustrate prospective and cross-sectional views of a shearing-force mechanism with differential compressive strain in accordance with one embodiment.
Figure 5B:
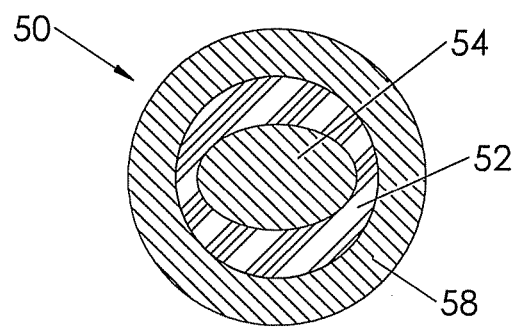
Figure 6A:
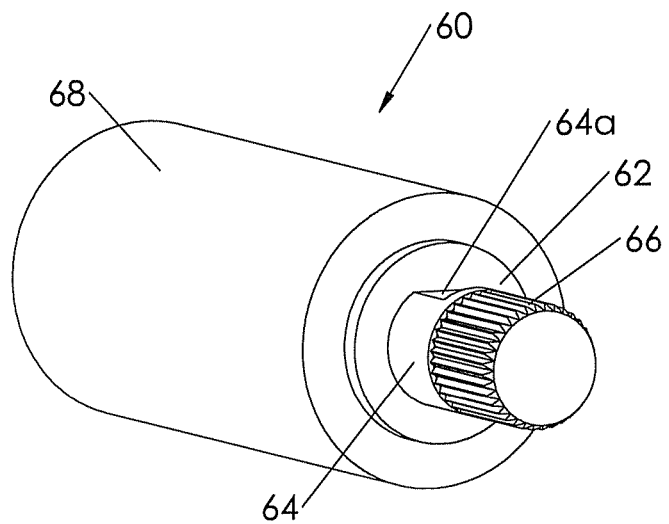
FIGS. 6A and 6B illustrate prospective and cross-sectional views of a shearing-force mechanism with differential compressive strain in accordance with one embodiment.
Figure 6B:
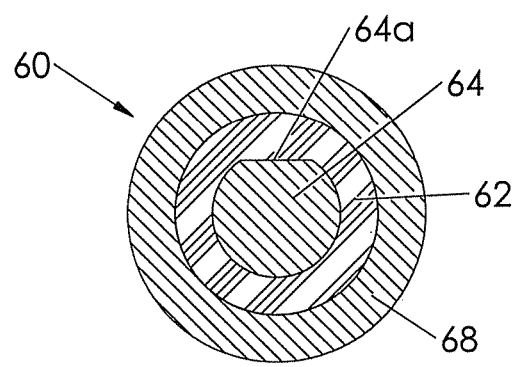

FIGS. 3A and 3B illustrate respective prospective and cross-sectional views of shearing-force mechanism 30 with differential compressive strain in accordance with one embodiment. Shearing-force mechanism 30 includes sleeve 32, shaft 34 and housing 38. Similar to shearing-force mechanism 20 in FIG. 2A, shearing-force mechanism 30 can be configured as torque hinge. For example, a hinged mount can be added (like hinged mount 29 in FIG. 2A) such that shaft 34 and knurls 36 are configured for engagement with a receiving hole in the hinged mount. Similarly, housing 38 can be configured for mounting, such as housing 28 in FIG. 2A. Such a torque hinge with relatively uniform toque could be used in a computer laptop, for example, to hinge a screen relative to a base.

Shearing-force mechanism 30 is also configured with cyclic differential compressive strain. As such, it is not subject to the same temperature dependence observed in compressed shearing-force mechanism 10. In one embodiment, cyclic differential compressive strain is achieved by avoiding significant interference between sleeve 32 and housing 38 while at rest, and inducing compressive strain while components are moving relative to each other over many thousands of cycles.

In one embodiment, sleeve 32 is made of a cross-linked thermoplastic material, such as PEX-A, PEX-B, or PEX-C. Sleeve 32 is fixed securely to shaft 34, and in one embodiment it is secured to shaft 34 by interference with the shaft knurls, such that there is no relative rotation between them. Housing 38 is fitted over sleeve 32, and in one embodiment, housing 38 is configured with first and second protrusions 38a and 38b. In one embodiment, sleeve 32 has slots to accommodate and receive first and second protrusions 38a and 38b so as to avoid interference between sleeve 32 and housing 38 when there is no relative rotation between them. In another embodiment, once housing 38 and first and second protrusions 38a and 38b are inserted over sleeve 32, sleeve 32 is allowed to relax and compressive strain initially imposed on sleeve 32 will largely dissipate.

In one embodiment, there is little or no interference between sleeve 32 and housing 38, and is little or no interference between sleeve 32 and shaft 34, while there is no relative movement between sleeve 32, shaft 34 and housing 38. As such, while shearing-force mechanism 30 is at rest, that is, no relative rotation between housing 38 and sleeve 32, there is little or no compressive strain ($\epsilon$) imposed on sleeve 32. However, when shearing-force mechanism 30 is active, that is, there is relative rotation between housing 38 and sleeve 32, significant compressive strain ($\epsilon$) is imposed on sleeve 32 during that relative rotation.

Similar to that described above with respect the embodiments in FIGS. 2A and 2B, as housing 38 is rotated, and thus, first and second protrusions 38a and 38b are rotated, first and second protrusions 38a and 38b move from the slots accommodating them in sleeve 32 and begin to drive into adjacent sections of sleeve 32 causing compressive strain ($\epsilon$) on sleeve 32. As such, compressive strain ($\epsilon$) on sleeve 32 changes from little or no compressive strain ($\epsilon$) to significant compressive strain ($\epsilon$) as housing 38 and sleeve 32 changes from no relative rotation to relative rotation. In one embodiment, this differential compressive strain ($\epsilon$) is greater than 3 percent, and in another is greater than 6 percent.

As above, temperature changes have little effect on shearing-force mechanism 30 in one embodiment, because of relatively low internal stresses within the cross-linked thermoplastic material. Shearing-force mechanism 30 also produces a repeatable shearing force over thousands of cycles of rotation between housing 38 and sleeve 32. This repeatable shearing force is relatively stable, even over substantial temperature changes.

FIGS. 4A and 4B, 5A and 5B, and 6A and 6B illustrate alternative respective prospective and cross-sectional views of shearing-force mechanisms 40, 50 and 60, each with cyclic differential compressive strain in accordance with various embodiments. Each of shearing-force mechanisms 40, 50 and 60 respectively include a sleeve 42, 52, 62, a shaft 46, 56, 66, and a housing 48, 58, 68. Similar to shearing-force mechanism 20 in FIG. 2A, each shearing-force mechanism 40, 50 and 60 can be configured as torque hinge. For example, a hinged mount can be added (like hinged mount 29 in FIG. 2A) and each housing 48, 58 and 68 can be configured for mounting, such as housing 28 in FIG. 2A. Such a torque hinge with relatively uniform toque could be used in a computer laptop, for example, to hinge a screen relative to a base.

In each of shearing-force mechanisms 40, 50 and 60, the shaft 44, 54, 64 includes a non-circular feature, similar to protrusions 24a and 24b in mechanism 20. Shaft 44 of shearing-force mechanism 40 is square, shaft 54 of shearing-force mechanism 50 is oval, and shaft 64 of shearing-force mechanism 60 includes detent 64a. Sleeves 42, 52, and 62 are fixed securely to housings 48, 58, and 68 such that no relative motion occurs between sleeve and housing.

In one embodiment, there is little or no interference between sleeve 32 and housing 38, and is little or no interference between sleeve 32 and shaft 34, while there is no relative movement between sleeve 32, shaft 34 and housing 38. As such, while shearing-force mechanism 30 is at rest, that is, no relative rotation between housing 38 and sleeve 32, there is little or no compressive strain ($\epsilon$) imposed on sleeve 32. However, when shearing-force mechanism 30 is active, that is, there is relative rotation between housing 38 and sleeve 32, significant compressive strain (ε) is imposed on sleeve 32 during that relative rotation.

Similar to that described above with respect the embodiments in FIGS. 2A and 2B and 3A and 3B, as the shaft 44, 54, 64 is rotated, the features move from the slots or pockets accommodating them in their respective sleeves 42, 52, and 62 and begin to drive into adjacent sections of the sleeve causing compressive strain (ε) on the sleeve. As such, compressive strain (ε) on sleeves 42, 52, and 62 changes from little or no compressive strain (ε) to significant compressive strain (ε) as shafts 44, 54, 64 and sleeves 42, 52, and 62 change from no relative rotation to relative rotation.

One skilled in the art will understand that the embodiments illustrated exemplify configurations for generating shearing force for elements in relative motion and the other exemplary configurations are possible. For example, these non-circular features can be added to the housing, rather than, or in addition to, on the shaft.

Although specific embodiments have been illustrated and described herein, it will be appreciated by those of ordinary skill in the art that a variety of alternate and/or equivalent implementations may be substituted for the specific embodiments shown and described without departing from the scope of the present invention. Particularly, while the embodiments described here illustrate an annular sleeve of cross-linked thermoplastic capable of relative rotation with a non-circular shaft or housing, many other geometries are possible within the scope of the materials and cyclic compressive strain during rotation of various embodiments. Among the various embodiments, shearing-force mechanisms can include a disk of cross-linked thermoplastic in relative rotation with a second disk with radial protrusions; it can include an annulus of cross-linked thermoplastic in linear (axial) relative motion with a cylindrical rod or housing with circumferential protrusions; and it can include a spherical piece of cross-linked thermoplastic in relative motion with a spherical socket provided with protruding dimples.

This application is intended to cover any adaptations or variations of the specific embodiments discussed herein. Therefore, it is intended that this invention be limited only by the claims and the equivalents thereof.

What is claimed is:

1. A positioning device comprising:
   a first element comprising a cross-linked thermoplastic;
   a non-circular second element configured radially adjacent a first side of the first element, and configured for relative rotation with the first element about an axis; and
   a third element configured radially adjacent a second side of the first element;
   wherein the non-circular second element is configured to slip relative to the first element during relative rotation of the first and second elements thereby producing a substantially repeatable shearing force; and
   wherein the first, second and third elements are configured such that the first element is unstrained and not compressed by either the second or third elements while there is no relative rotation between the first and second elements and a compressive strain of at least 3 percent is induced on the first element by a feature of the second or third element while there is relative rotation between the first element and the second element.

2. The positioning device of claim 1, wherein the relative rotation between the first element and the second element produces a substantially repeatable shearing force over at least one thousand cycles between the first element and the second elements.

3. The positioning device of claim 1, wherein the first element comprises a sleeve configured over the second element, the second element comprising a shaft with the feature configured to strain the sleeve during relative rotation of the shaft and sleeve.

4. The positioning device of claim 3, wherein the feature is one of a group comprising: protrusions, an oval shape, a square shape and a detent.

5. The positioning device of claim 1, wherein the first element comprises a sleeve configured within the second element, the second element comprising a housing with the feature configured to strain the sleeve during relative rotation of the housing and sleeve.

6. The positioning device of claim 5, wherein the feature is one of a group comprising: protrusions, an oval shape, a square shape and a detent.

7. The positioning device of claim 1, wherein the cross-linked thermoplastic of the first element comprises a cross-linked polyethylene (PEX).

8. The positioning device of claim 1, wherein the cross-linked thermoplastic of the first element is characterized by one of a group of characteristics comprising: having a molecular weight less than 3,000,000, having a melt flow index greater than zero, being cross-linked after being molded into a desired shape, being cross-linked as it is formed into a desired shape, and having a modulus of 200,000 psi or less.

9. The positioning device of claim 1, wherein a compressive strain of at least six percent is induced on the first element while there is relative rotation between the first element and the second element.

10. A positioning device comprising:
    a first element comprising a cross-linked thermoplastic;
    a non-circular second element configured radially adjacent a first side of the first element and configured for relative rotation with the first element about an axis, the non-circular second element comprising first and second protrusions; and
    a third element configured radially adjacent a second side of the first element;
    wherein the first element and the second element are configured to transition between relative stationary conditions and relative rotational conditions;
    wherein the first element is configured to slip relative to the second element during relative rotation of the first and second elements thereby producing a substantially repeatable shearing force;
    wherein the first element is subjected to substantially no compressive strain and is not compressed by either the second or third elements in the stationary condition; and
    wherein during the transition of the positioning device from stationary condition to rotational condition the first and second protrusions are configured to strain the first element thereby inducing compression strain on the first element of at least 3 percent.

11. The positioning device of claim 10, wherein the relative rotation between the first element and the second element produces a substantially repeatable shearing force over at least one thousand cycles between the first element and the second elements.

12. The positioning device of claim 11, wherein the cross-linked thermoplastic of the first element comprises a cross-linked polyethylene (PEX).

13. The positioning device of claim 10, wherein the cross-linked thermoplastic of the first element is characterized by one of a group of characteristics comprising: having a molecular weight less than 3,000,000, having a melt flow index greater than zero, being cross-linked after being molded into a desired shape, being cross-linked as it is formed into a desired shape, and having a modulus of 200,000 psi or less.

14. The positioning device of claim 10, wherein the compressive strain on the first element is at least a six percent compressive strain in the rotational condition.

15. A rotary damping device comprising:
a first element comprising a cross-linked thermoplastic;
a non-circular second element configured radially adjacent a first side of the first element, and configured for relative rotation with the first element about an axis;
a third element configured radially adjacent a second side of the first element;
wherein the first, second and third elements are configured such that essentially no compressive strain and no compression is induced on the first element by a feature of the second or third element while there is no relative rotation between the first and second elements and compressive strain of at least 3 percent is induced on the first element by the feature while there is relative rotation between the first element and the second element; and
wherein the rotary damping device is configured such that torque increases as the relative speed at which first and second elements rotate also increases.

16. A positioning device comprising:
a first element comprising a cross-linked thermoplastic;
a second element configured radially adjacent a first side of the first element, and configured for relative rotation with the first element about an axis;
a third element configured radially adjacent a second side of the first element; and
wherein one of the first and second elements comprise a non-circular feature and the other of the first and second elements comprise a receiving feature configured to receive the non-circular feature such that the cross-linked thermoplastic avoids any compression by adjacent elements such that it is substantially unstrained when the non-circular feature is received in the receiving feature, and such that the first element slips relative to the second element such that the positioning device produces substantially consistent torque as the first and second element are rotated relative to each other even after positioning device is subjected to temperature changes; and
wherein a compressive strain of at least six percent is induced on the first element when the non-circular feature is rotated out of the receiving feature.

17. A positioning device comprising:
a non-circular shaft having a maximum radial dimension relative to its center axis about which it is configured to rotate;
a cross-linked thermoplastic element configured radially adjacent the non-circular shaft; and
a housing configured radially adjacent cross-linked thermoplastic element and configured with a minimum radial dimension relative to the center axis;
wherein the non-circular shaft is configured to slip relative to the cross-linked thermoplastic element as the non-circular shaft and the cross-linked thermoplastic element are rotated relative to each other thereby producing a substantially repeatable shearing force;
wherein the non-circular shaft, cross-linked thermoplastic element and housing are configured such that the cross-linked thermoplastic element is unstrained and not compressed by the non-circular shaft or housing while there is no relative rotation between the non-circular shaft and the cross-linked thermoplastic element and a compressive strain of at least 3 percent is induced on the cross-linked thermoplastic element by a feature on the shaft or housing while there is relative rotation between the non-circular shaft and the cross-linked thermoplastic element; and
wherein the maximum radial dimension of the non-circular shaft from the center axis is less than the minimum radial dimension of the housing from the center axis.

* * * * *